March 18, 1969  A. W. SCHRODER ET AL  3,433,243

STEAM TRAP

Filed June 20, 1966

INVENTORS
ALBERT W. SCHRODER
ROBERT G. MINER

BY
*Holmes & Andersen*
ATTORNEYS 3,433,243
STEAM TRAP
Albert W. Schroder and Robert G. Miner, La Crosse, Wis.,
 assignors to The Trane Company, La Crosse, Wis., a
 corporation of Wisconsin
Filed June 20, 1966, Ser. No. 558,939
U.S. Cl. 137—183                                           3 Claims
Int. Cl. F16t 1/00

ABSTRACT OF THE DISCLOSURE

A steam trap of the "impulse" or "thermodynamic" type having a valve seat of disc form and being symmetrical about a median plane parallel to the plane of its disc whereby the seat may be reversed to extend its operating life and a valve closure disc similary generally symmetrical for reversal to extend its operating life.

---

This invention relates to steam traps for automatically passing air and condensate from steam systems.

The present invention is particularly directed to traps having an intermediate chamber containing a valve disc arranged to contact inlet and outlet valve seats and prevent flow of steam through the trap.

The condition of the fluid in the intermediate chamber determines whether the valve disc contacts the valve seats or is spaced therefrom to permit the flow of condensate and air through the trap. When the condensate has passed from the trap, steam accumulates in the intermediate chamber above the valve disc to create a pressure and cause the disc to contact the valve seats.

Traps of this type have a limited useful life because the valve disc and the valve seats wear from the repeated opening and closing of the trap.

It is therefore an object of this invention to provide a valve seat and a valve disc each of which can be reversed when worn. Therefore the valve life between replacements of these parts is doubled.

It is another object of this invention to provide a trap having a monolithic body with a horizontal inlet and a downwardly extending outlet.

Other objects and advantages of this invention will become apparent as the specification proceeds to describe the invention with reference to the accompanying drawings in which.

Figure 2:
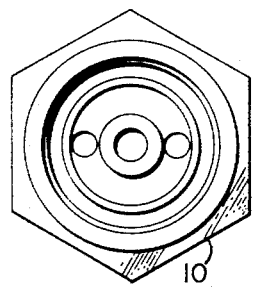
FIGURE 2 is a top view with the cap and sealing disc removed to show the interior construction.
Figure 1:
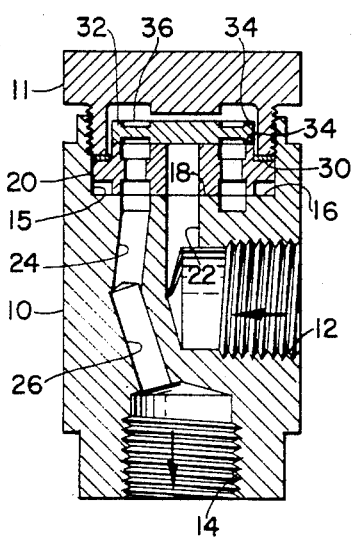
FIGURE 1 is a vertical central section of a steam trap of the present invention.
Figure 3:
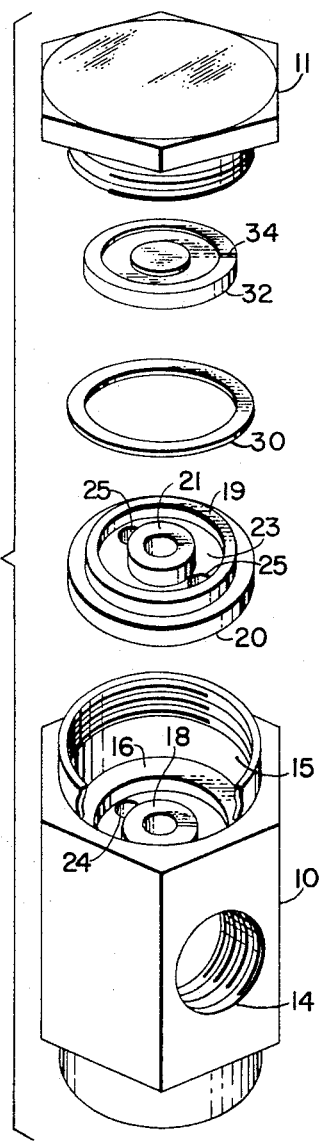
FIGURE 3 is an exploded perspective view of a trap of this invention.

Referring now to the drawings, the trap has a housing comprising an elongated body 10 and closure member in the form of a cap 11 secured to the body. The body 10 has inlet and outlet openings 12 and 14 respectively for threadedly receiving the ends of pipes to connect the trap into a steam system.

An opening 15 extends downwardly from the top of body 10. A face 16 and a boss 18 support a seat member 20 in the opening 15. Seat member 20 is preferably of stainless steel and has an outer valve seat 19 and an inner valve seat 21 on each face for engaging the face 16 and boss 18, respectively. Each face of seat member 20 has a groove 23. One or more holes 25 extend through the seat member 20. It is thus seen that seat member 20 is substantially symmetrical about a plane parallel to and substantially midway between its faces.

An inlet passageway 22 extends upwardly from the inlet opening 12 to the face of boss 18. One or more passageways 24 extend downwardly from opening 15 and communicate with one or more passageways 26 which in turn communicate with outlet opening 14.

Cap 11 is in threaded engagement with body 10 and bears against a metal gasket 30 which in turn bears against seat member 20 and holds it in sealing engagement with face 16 and boss 18.

A valve disc 32 is mounted in cap 11 and engages the seat member 20 to close the inlet passageway 18. The sealing disc 32 is preferably of stainless steel and is substantially symmetrical about a plane substantially midway between its opposite faces.

The valve disc 32 is held in its closing position by its weight and the difference in forces from the pressure in the chamber above the disc and the sum of the forces from the pressure in passageway 22 and the pressure in discharge passageway 24.

Each face of the valve disc 32 has a groove 34 which forms a restricted passageway and forms a bleeder duct to conduct fluid from the chamber above the valve disc 32. The rate of flow through the groove 34 determines the duration of the period in which the valve disc 32 remains in closed position.

The valve disc 32 has grooves 36 to reduce the weight of the member and to improve the flow characteristics from the space below the valve disc 32 to the space above the valve disc 32.

We claim:
1. A steam trap comprising a body, a closure member secured to said body and forming therewith a chamber, a seat member of disc form in said chamber and having a groove in each of its opposite faces to define on each face an inner valve seat and an outer valve seat, a first passageway through said seat member and disposed within said inner valve seat and adapted to be put in fluid communication with a source of steam, a second passageway through said seat member and disposed in said grooves and adapted to be put in fluid communication with an outlet for steam condensate and air, a valve disc in the chamber and movable therein from a position contacting said inner valve seat and said outer valve seat to a position spaced therefrom, means on said valve disc and on said closure member for maintaining an intermediate chamber between said valve disc and said closure member, said valve disc having an each face surfaces adapted to engage the inner valve seat and the outer valve seat of the seat member to seal the intermediate chamber from the first and second passageways, said disc having an annular groove and a restricted passageway on each face, the latter for conducting fluid from said intermediate passageway to said seat grooves, flange means on said seat member intermediate its faces, said closure member cooperating with said flange means to retain said seat member secured to the body.

2. A steam trap according to claim 1 in which the restricted passageways are constructed and arranged for substantially equal flow with either face of the valve disc in operative relation to the valve seat.

3. A steam trap according to claim 1 in which said restricted passageway means is constructed and arranged for substantially equal flow with either face of the valve disc in operative relation to the valve seat.

References Cited

UNITED STATES PATENTS

| | | | |
|---|---|---|---|
| 2,767,730 | 10/1956 | Laird | 137—329.02 |
| 2,945,505 | 7/1960 | Hansen | 137—183 |
| 3,347,257 | 10/1967 | Gleason | 137—183 |

ALAN COHAN, Primary Examiner.

U.S. Cl. X.R.
137—329.02